(12) United States Patent
Chen

(10) Patent No.: US 6,476,963 B1
(45) Date of Patent: Nov. 5, 2002

(54) PHOTOGRAPHIC BINOCULAR

(75) Inventor: Chao-Peng Chen, Changhua (TW)

(73) Assignee: Navitek Technology Inc., Changhua (TW)

( * ) Notice: Subject to any disclaimer, the term of this patent is extended or adjusted under 35 U.S.C. 154(b) by 0 days.

(21) Appl. No.: 09/977,325

(22) Filed: Oct. 16, 2001

(51) Int. Cl.$^7$ .............................................. G02B 23/00
(52) U.S. Cl. ...................... 359/412; 359/363; 359/407; 359/480
(58) Field of Search ................................ 359/362–363, 359/399, 402, 404–410, 426, 819, 480–482

(56) References Cited

U.S. PATENT DOCUMENTS

| | | | | |
|---|---|---|---|---|
| 4,067,027 A | * | 1/1978 | Yamazaki | 359/407 |
| 4,445,766 A | * | 5/1984 | Yamazaki | 359/407 |
| D375,510 S | * | 11/1996 | Kung | D16/132 |
| D425,922 S | * | 5/2000 | Huckenbeck | D16/133 |
| 6,088,053 A | * | 7/2000 | Hammack et al. | 348/61 |
| 6,323,997 B1 | * | 11/2001 | Lee | 359/412 |
| 6,324,021 B1 | * | 11/2001 | Shields | 359/819 |

* cited by examiner

Primary Examiner—Thong Nguyen
(74) Attorney, Agent, or Firm—Jones, Tullar & Cooper, P.C.

(57) ABSTRACT

Photographic binoculars include binoculars and a tube with a camera detachably connected to the tube. A focus adjusting mechanism of the binoculars correspond to a focus adjusting mechanism of the tube so that the adjustment to the focal length of the binoculars simultaneously adjusts the focal length of the tube. The camera is able to record an image of a subject observed from the binoculars.

11 Claims, 8 Drawing Sheets

PHOTOGRAPHIC BINOCULAR

BACKGROUND OF THE INVENTION

1. Field of the Invention

The present invention relates to photographic binoculars, and more particularly to binoculars attached with a third tube and a photographic device. The focus of the third tube is adjustable along with the focus of the binoculars so that a user is able to record the image directly by the photographic device after observing from the binoculars.

2. Description of Related Art

When a user is watching and observing wild life in a country site, normally the user carries binoculars for that purpose. For those who do research on wild life, binoculars seem not sufficient to accomplish the goal. Photographing or filming the wild life is the best solution for research. In order to achieve this purpose, the user will have to bring along not only binoculars, but also am image recording device so that after the user finds an interesting subject, the user is able to use the image recording device to film or photograph the subject. However, while observing the subject, the user focuses the lenses of the binocular to have a good and clear look at the subject. After the user decides to record the subject and takes out the image recording device, the user will still have to focus the image recording device again, which is quite time consuming and labor inefficient.

To overcome the shortcomings, the present invention tends to provide improved binoculars to mitigate and obviate the aforementioned problems.

SUMMARY OF THE INVENTION

The primary objective of the present invention is to provide binoculars with an image recording device connected to the binoculars so that whatever the user sees from the binoculars, the user is able to use the image recording device to record the image of the observed subject.

Another objective of the present invention is that the focus adjusting mechanism of the binoculars is linked to the focus adjusting mechanism of the image recording device so that when the user adjusts the focus of the binoculars, the focus of the image recording device is also adjusted and is ready to take pictures.

Still another objective of the present invention is to have a cable extending out from the image recording device to allow the user to transmit the picture electronically.

Other objects, advantages and novel features of the invention will become more apparent from the following detailed description when taken in conjunction with the accompanying drawings.

DETAILED DESCRIPTION OF THE PREFERRED EMBODIMENT

Figure 1:
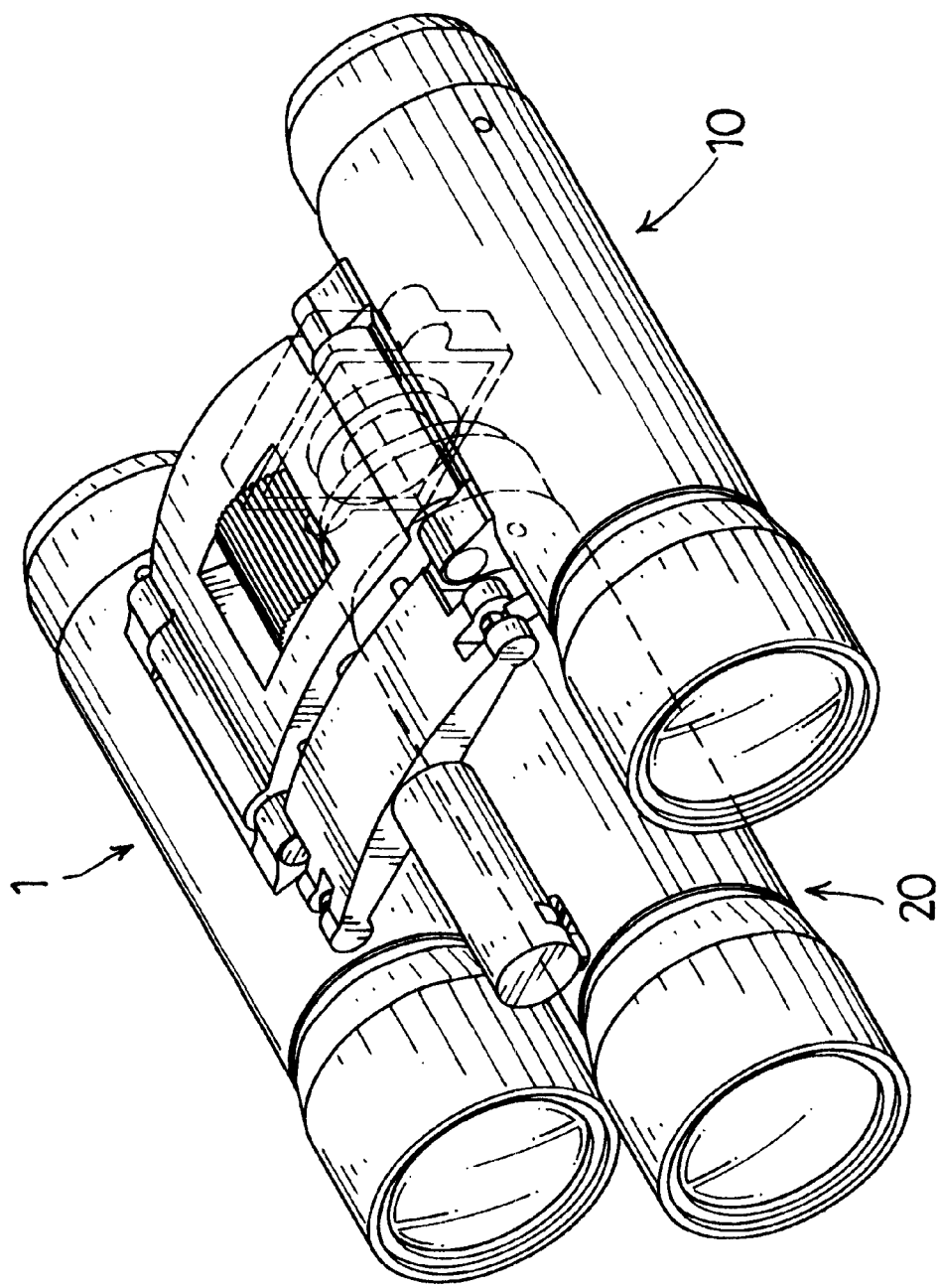
FIG. 1 is a perspective view of the photographic binoculars of the present invention.
Figure 2:
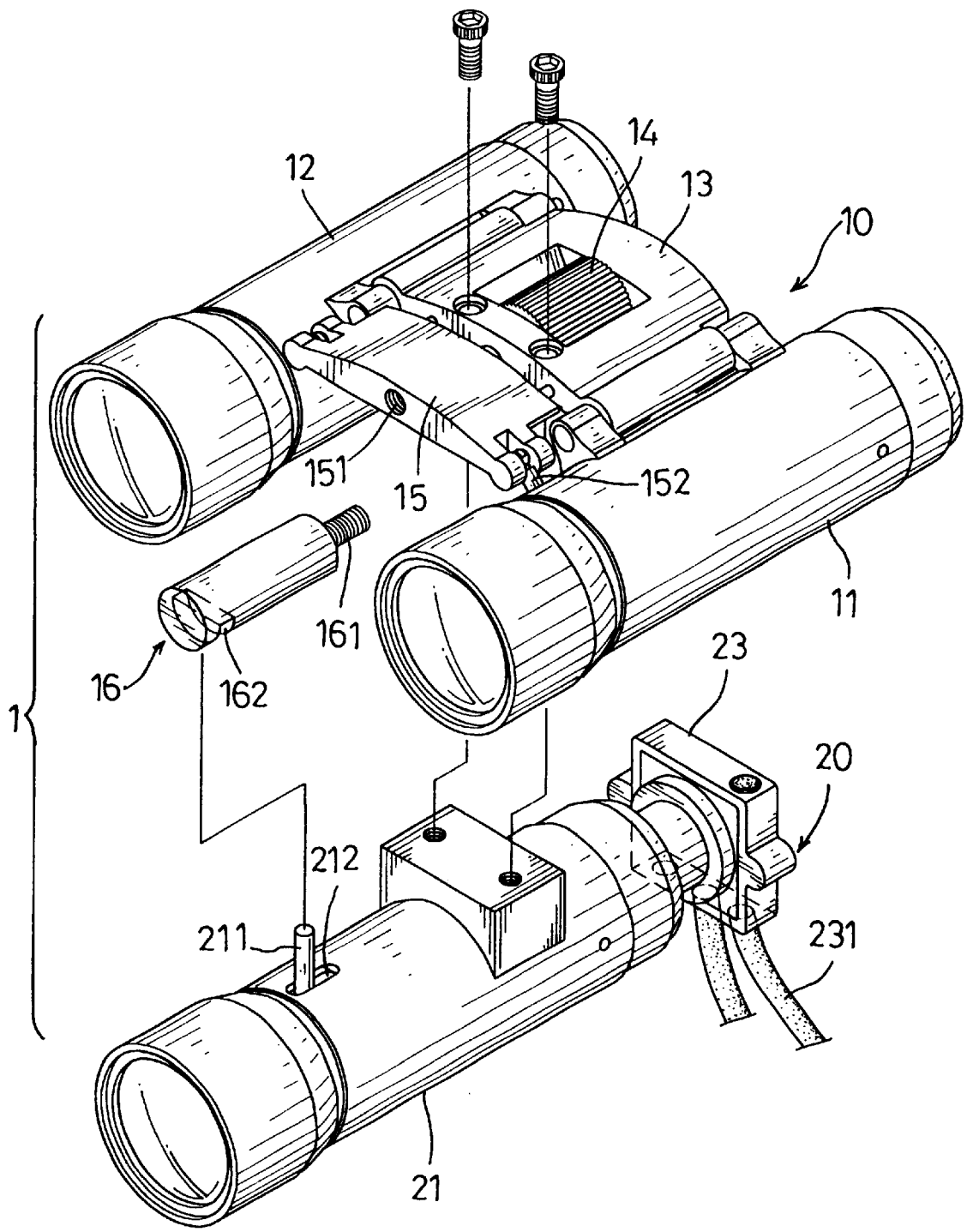
FIG. 2 is an exploded perspective view of the binoculars in FIG. 1.

With reference to FIGS. 1 and 2, a photographic binoculars (1) in accordance with the present invention has a pair of binoculars (10) and an image recording device (20).

The structure of the binoculars (10) of the present invention is basically the same as a conventional binocular. That is, the binoculars (10) has a first tube (11) and a second tube (12) securely connected to the first tube (11) by a connecting bridge (13) with an adjusting knob (14) pivotally received inside the connecting bridge (13). A link (15) is provided between the first and second tubes (11, 12) and is movable relative to the connecting bridge (13).

Figure 3:
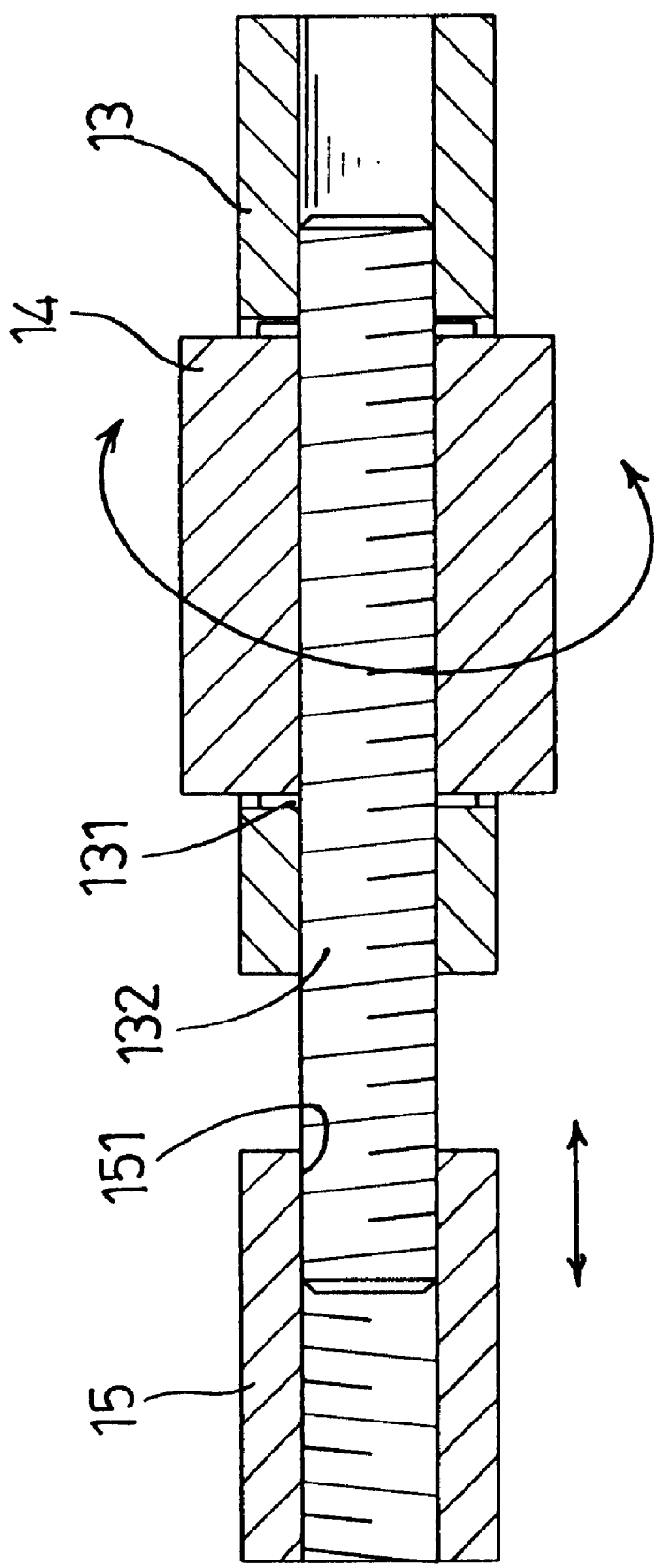
FIG. 3 is a cross sectional view of the engagement between the adjusting knob and the driven plate.
Figure 4:
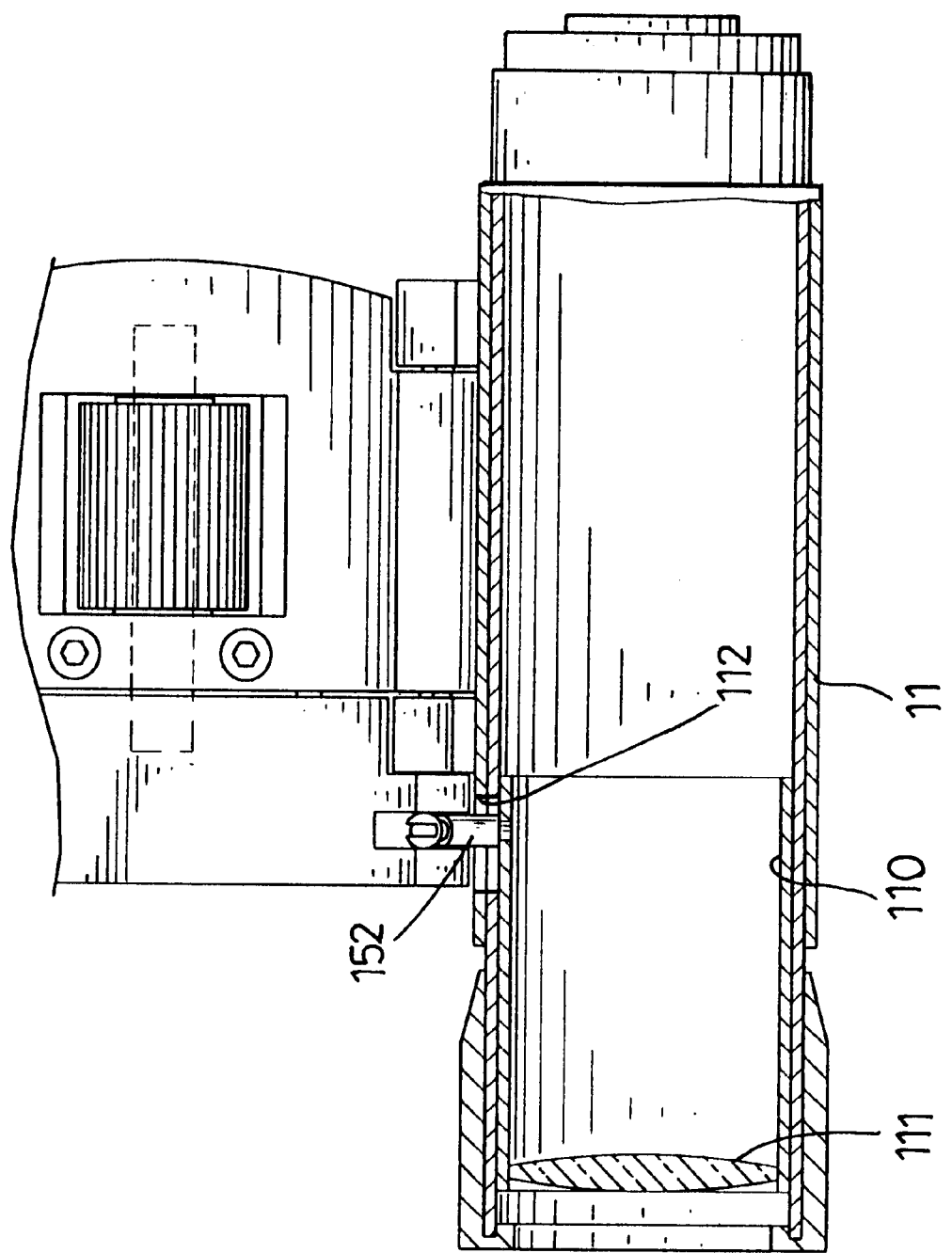
FIG. 4 is a partial cross sectional view of the focus adjusting mechanism of the binoculars of the present invention.

With reference to FIG. 3 and still taking FIG. 2 for reference, the connecting bridge (13) has a hole (131) defined inside the connecting bridge (13) to receive therein a threaded bolt (132) which is securely engaged with the adjusting knob (14) such that when the adjusting knob (14) is pivoted, the threaded bolt (132) is driven to rotate. The threaded bolt (132) extends into a threaded through hole (151) defined in the link (15), such that when the adjusting knob (14) pivots, the link (15) moves relative to the connecting bridge (13). Because the focus adjusting mechanism of the first and second tubes (11, 12) of the binocular first tube (11) is the same, only one side of the focus adjusting mechanism is explained hereinafter. With reference to FIG. 4, because a lip (152) is formed on a side face of the link (15) and extends into a first inner tube (110) which is slidably received in the first tube (11) to securely engage with the first inner tube (110), when the adjusting knob (14) is pivoted and the link (15) moves, the first inner tube (110) is also moved. With such an arrangement, when the user adjusts the adjusting knob (14), with the provision of the link (15), the focus of the binoculars (10) is adjusted.

Figure 5:
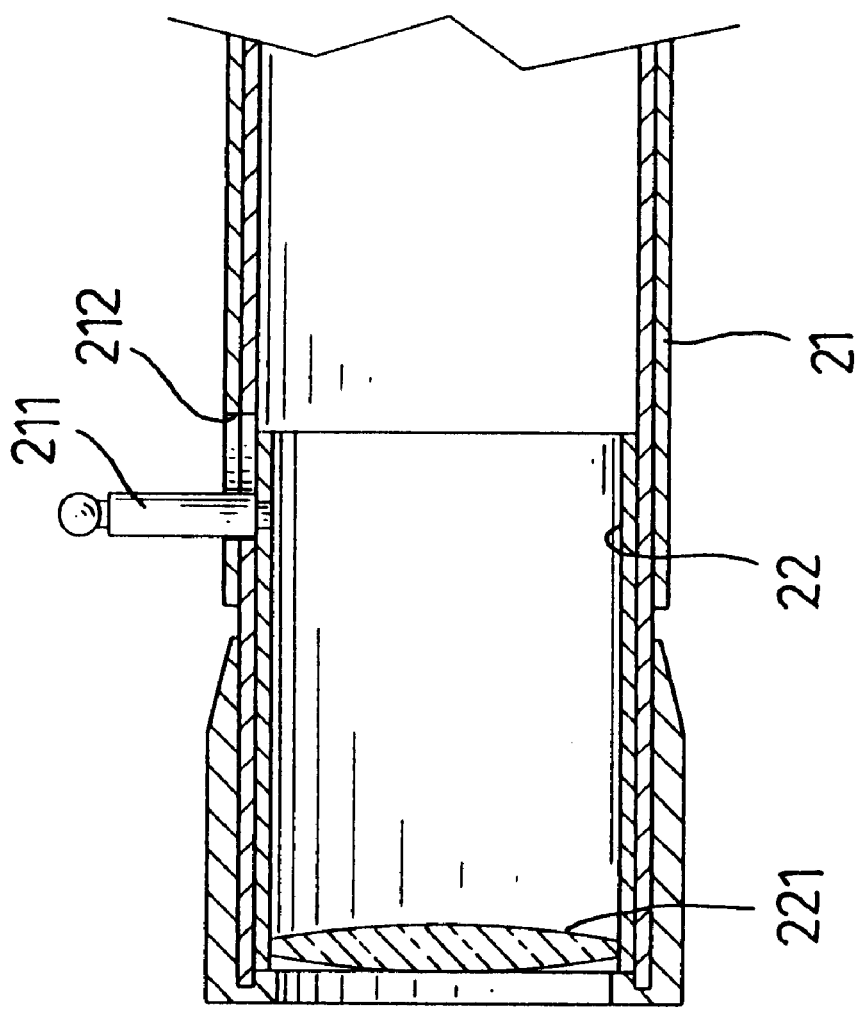
FIG. 5 is a partial cross sectional view of the focus adjusting mechanism of the image recording device of the present invention.

With reference to FIG. 5 and still taking FIG. 2 for reference, the binoculars (10) further have a driving rod (16) with a head (161) extending into the threaded through hole (151) of the link (15) to securely connect the driving rod (16) to the link (15). The driving rod (16) has an arcuate recess (162) defined in a bottom face of the driving rod (16). The image recording device (20) of the photographic binoculars (1) of the present invention has a third tube (21) with a driven rod (211) movably received in an elongated hole (212) in a face of the third tube (21) of the image recording device (20). The driven rod (211) corresponds to the arcuate recess (162) of the driving rod (16) so that a free end of the driven rod (211) is able to rest in the arcuate recess (162), whereby the movement of the link (15) also drives the driven rod (211) to move in the same direction. Moreover, the third tube (21) has a sleeve (22) slidably received in the third tube (21) and having a third lens (221) securely received in the sleeve (22). The driven rod (211) is securely engaged with the sleeve (22), such that when the driven rod (211) is moved due to the movement of the driving rod (16), the sleeve (22) as well as the lens (221) also moves in the third tube (21).

Figure 6:
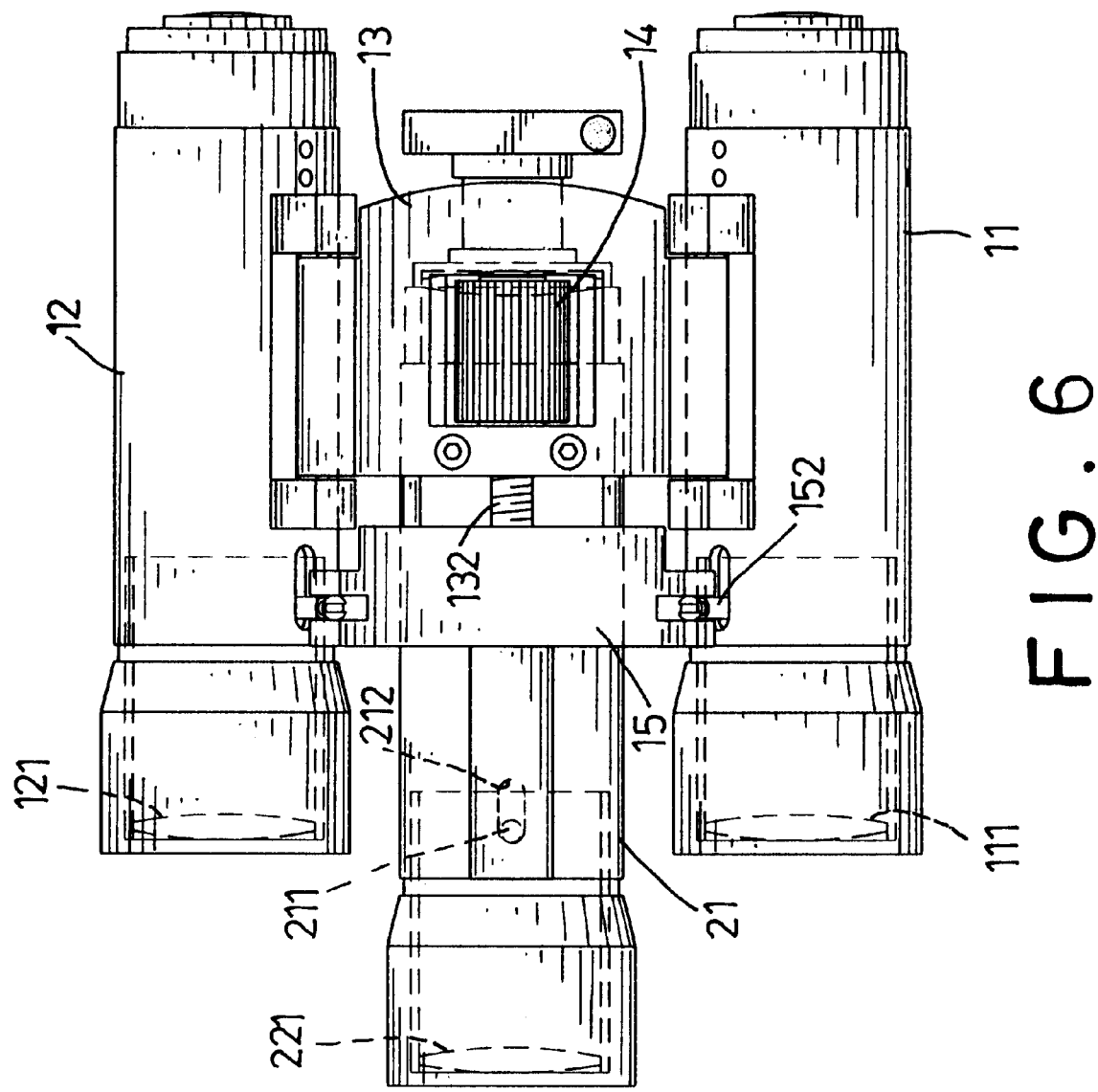
FIG. 6 is a side plan view of the first relative positions of the lenses in the binoculars and the image recording device.
Figure 7:
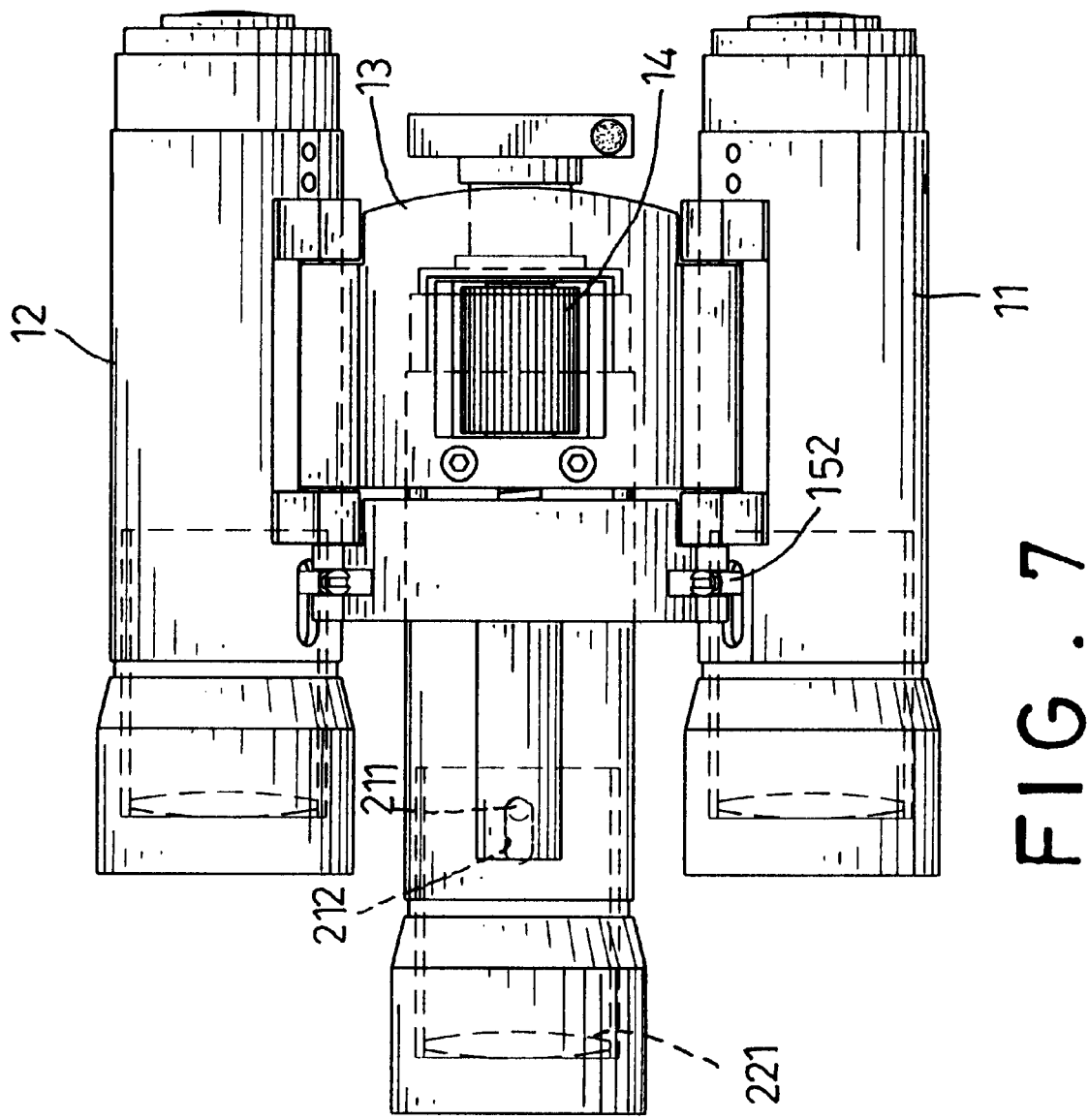
FIG. 7 is a side plan view of the second relative positions of the lenses in the binoculars and if the image recording device.
Figure 8:
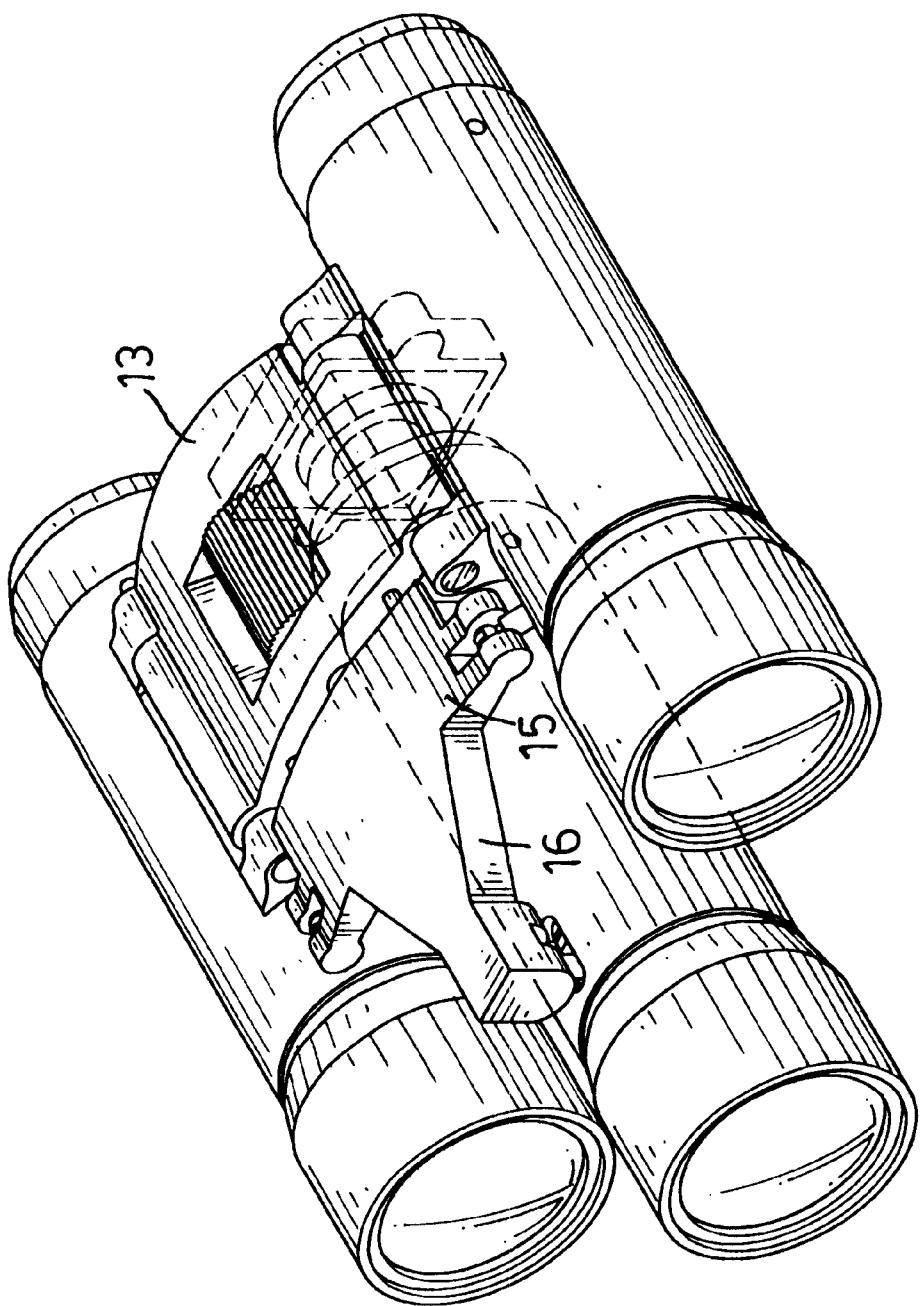
FIG. 8 is a perspective view showing another embodiment of the present invention.

With reference to FIGS. 6, 7 and still taking FIG. 2 as a reference, after the introduction of the foregoing interrelationship of the focus adjusting mechanism between the binocular (10) and the image recording device (20), when the user pivots the adjusting knob (14), the pivotal movement of the threaded bolt (132) drives the link (15) to move. As the link (15) moves, due to the secure engagement of the driving rod (16) wit6h the link (15), the driving rod (16) also moves along with the link (15). Because the driven rod (211) rests in the arcuate recess (162) in the driving rod (16), the driven rod (211) is driven by the driving rod (16) to move in the same direction as that of the driving rod (16). As previously described, the first tube (11) has the first lens (111) securely received in the first inner tube (110). The second tube (12) also has a second lens (121) securely received in a second inner tube (not shown) and the third tube (21) has the third lens (221) securely received in the sleeve (22) such that when the adjusting knob (14) is pivoted, the first lens (111), the second lens (121) and the third lens (221) will move simultaneously in the same direction. With such an arrangement, the adjustment to the focus of the binoculars (10) also accomplishes adjustment of the focus of the third tube (21). From the appendix drawing of FIG. 2, the image recording device (20) has not only the third tube (21), but also a camera (23) with the third tube (21) detachably connected to the front of the camera (23). Furthermore, the camera (23) may also be a digital camera with a cable (231) extending out so that the user is able to transmit the captured image with the digital camera electronically.

What is claimed is:

1. A photograph binocular, comprising:
   a binocular having an adjusting knob pivotally received between a first tube and a second tube to adjust a focal length of the binocular and a link operatably connected to the adjusting knob so as to move within a predetermined distance; and
   a tube with a sleeve slidably received in the tube, a lens securely received in the sleeve, a driven rod securely connected to the sleeve and extending out from a periphery of the tube to engage the link so that the movement of the fink drives the driven rod to move and thus a focal length of the tube is adjusted and a camera detachably connected to one side of the tube such that a subject seen from the binocular is able to be seen from the tube and an image of the subject is able to be taken by the camera.

2. The photographic binocular as claimed in claim 1, wherein the link further has a threaded through hole so defined that a threaded bolt formed with the adjusting knob extends into the threaded through hole so that the pivotal movement of the adjusting knob drives the link to move.

3. The photographic binocular as claimed in claim 2, further comprising: a driving rod with a head oppositely extending into the threaded through hole relative to the threaded bolt; and an arcuate recess in a bottom face of the driving rod to receive a free end of the driven rod so that the pivotal movement of the adjusting knob drives the link, the driving rod and the driven rod to linearly move in the same direction, whereby the focal lengths of the binocular and the tube are adjusted simultaneously.

4. The photographic binocular as claimed in claim 3, wherein an elongated hole is peripherally defined in the tube to receive therein the driven rod so that the driven rod is able to move inside the elongated hole when driven.

5. The photographic binocular as claimed in claim 4, wherein the camera is a digital camera with a cable extending out from the digital camera so as to transmit a taken image electronically.

6. The photographic binocular as claimed in claim 2, wherein an elongated hole is peripherally defined in the tube to receive therein the driven rod so that the driven rod is able to move inside the elongated hole when driven.

7. The photographic binocular as claimed in claim 6, wherein the camera is a digital camera with a cable extending out from the digital camera so as to transmit a taken image electronically.

8. The photographic binocular as claimed in claim 1, wherein an elongated hole is peripherally defined in the tube to receive therein the driven rod so that the driven rod is able to move inside the elongated hole when driven.

9. The photographic binocular as claimed in claim 1, wherein the camera is a digital camera with a cable extending out from the digital camera so as to transmit a taken image electronically.

10. The photographic binocular as claimed in claim 1, further comprising: a driving rod with a head oppositely extending into the threaded through hole relative to the threaded bolt; and an arcuate recess in a bottom face of the driving rod to receive a free end of the driven rod so that the pivotal movement of the adjusting knob drives the link, the driving rod and the driven rod to linearly move in the same direction, whereby the focal lengths of the binocular and the tube are adjusted simultaneously.

11. The photographic binocular as claimed in claim 10, wherein the camera is a digital camera with a cable extending out from the digital camera so as to transmit a taken image electronically.

* * * * *